Patented Nov. 28, 1950

2,532,240

UNITED STATES PATENT OFFICE 2,532,240

UNSATURATED ALKYD FOAM RESINS

John B. Ott, Dayton, Ohio, assignor to Monsanto Chemical Company, St. Louis, Mo., a corporation of Delaware No Drawing. Application July 9, 1949,
Serial No. 103,961

7 Claims. (Cl. 260—2.5)

This invention relates to foam resins. More particularly, the invention relates to resinous foams prepared from unsaturated alkyd resins.

One object of this invention is to provide foamed unsaturated alkyd resins.

Another object is to provide foams which are thermoplastic but which may be cured to an insoluble, infusible state.

Still another object is to provide a process for preparing resinous foams from unsaturated alkyd resins.

These and other objects are attained by modifying an unsaturated alkyd resin with a methylol melamine or an alkyl ether thereof, and diphenyl-4,4'-di(sulfonyl azide) and heating the mixture at 140 to 150° C.

The following examples are given in illustration and are not intended as limitations on the scope of this invention. Where parts are mentioned they are parts by weight.

Example I

An unsaturated alkyd resin is prepared by reacting 295 parts of phthalic anhydride with 685 parts of maleic anhydride, 560 parts of ethylene glycol and 37 parts of butanol at reflux temperature until a liquid resin having an acid number of about 100 is obtained. To 85 parts of this resin are added 13 parts of hexamethylol melamine and 2 parts of diphenyl-4,4'-di(sulfonyl azide). The mixture is stirred until homogenous and then heated at about 150° C. for 30 minutes. The product is a tough, resilient foam having a specific gravity of about 0.4. The foam is thermoplastic and soluble in benzene and toluene.

Example II

To 100 parts of a liquid unsaturated alkyd resin made as shown in Example I, are added 15 parts of a butyl ether of hexamethylol melamine and 4 parts of diphenyl-4,4'-di(sulfonyl azide). On heating at 150° C. for 30 minutes a tough foam is produced having a specific gravity of about 0.2.

The foams prepared as shown in the examples are soluble and fusible. They are tough, elastic and resilient and may be used as insulation in places where they are subject to frequent and severe shock without breakdown of the cellular structure.

For applications which require a hard, insoluble and infusible insulation, the foams may be heated at 150 to 180° C. for two hours or more. At the end of the first two hours the foams are no longer soluble and fusible but they are still fairly tough and resilient. After a heat treatment of about 5 hours the foams become hard and brittle.

Diphenyl-4,4'-di(sulfonyl azide) is a new compound which is described and claimed in my co-pending application Serial No. 103,462, filed July 9, 1949 now U. S. Patent 2,518,249. The compound may be prepared by reacting diphenyl with chlorosulfonic acid and then reacting the product with an inorganic azide. It is stable at temperatures up to 140° C. and its decomposition between 140 and 150° C. may be easily controlled. Its stability at temperatures below 140° C. make it particularly valuable for incorporation into unsaturated alkyd resins since such incorporation is preferably carried out at elevated temperatures, i. e., up to about 135° C.

The amount of the azide to be used may be varied between about 1 to 25% or more by weight based on the weight of the alkyd resin. Less than 1% is ineffective both for forming foams and for insolubilizing the resin. Above 25%, little advantage is gained by using the excess. Between 1 and 25%, the amount used will depend on the required properties of the finished foams. Larger quantities produce foams having lower specific gravities if the foaming takes place in an open mold. In a closed mold the larger quantities develop more and smaller bubbles. Conversely, quantities near the lower point of the critical range yield foams having higher specific gravities. Furthermore, the amount of azide used will, at least in part, determine the degree of cross-linking obtained. At 25% azide, the foams will be rigid and brittle. At 4% azide, tough, resilient foams may be obtained which are insoluble in known solvents for the resins.

The temperature of the foaming step will also affect the type and nature of the foams produced. The foaming step must be carried out at 140 to 150° C. Below 140° C., substantially no decomposition of the azide occurs. Above 150° C., decomposition becomes uncontrollable and reproducible results cannot be obtained. Whereas, temperatures as low as 140° C. may be used, the time cycle is unnecessarily long. It is preferred to foam the resins at 144 to 146° C. which is the temperature at which the pure azide decomposes spontaneously when placed on a melting point bar. In this temperature range the decomposition is rapid and yet does not get out of hand and the results obtained are easily reproducible.

The resins which may be made into foams according to this invention are unsaturated alkyd or polyester resins.

Basically, the polyester resins of this invention may be made by condensing together at elevated temperatures a dihydric alcohol with an unsaturated dibasic acid using molecular equivalent proportions of each. A slight excess of either component may be used depending on whether a preponderance of alcoholic or acidic terminal groups is desired in the final resin. A large excess of either component will drastically reduce the number of average molecular weight of the resin.

The dihydric alcohols which may be used are the saturated glycols such as ethylene glycol, diethylene glycol, triethylene glycol, propylene glycol, butanediol-2,3, and the unsaturated glycols such as 2-butene-1,4-diol. A mixture of glycols may be used.

The dihydric alcohols may be partially replaced by monohydric alcohols or polyhydric alcohols containing more than two hydroxyl groups. Among the polyhydric alcohols which may be used are glycerol, pentaerythritol, mannitol, sorbitol, etc. Among the monohydric alcohols which may be used are methanol, ethanol, butanol, propanol, isopropanol, isobutanol, benzyl alcohol, allyl alcohol, ethallyl alcohol, methallyl alcohol, chlorallyl alcohol, cinnamyl alcohol, etc. Two or more of the monohydric and polyhydric alcohols may be used to modify the basic polyester resin.

The unsaturated dibasic acids may be used as the acids or as the anhydrides thereof. Any unsaturated dibasic carboxylic acid may be used including maleic, fumaric, itaconic, mesaconic, citraconic, methylene malonic, etc., acids. It is frequently found desirable to modify the properties of the polyester resin by substituting a saturated dibasic acid for part of the unsaturated dibasic acid. Included among the dibasic saturated acids are phthalic, mono-, di-, tri- or tetrachlorophthalic, isophthalic, terephthalic, diphenic, malonic, methyl malonic, succinic, glutaric, chloromaleic, acetyl malonic, adipic, sebacic acids or anhydrides. Furthermore, a minor proportion of the acidic component may be a saturated or unsaturated monobasic acid such as acetic, propionic, butyric, benzoic, acrylic, methacrylic, crotonic, cinnamic, etc. acids or the anhydrides thereof, oil acids, such as tung oil acids, linseed oil acids, soya bean oil acids, perilla oil acids, etc.

The ratio of alcoholic component to acidic component generally is 50:50 based on the available reactive groups, i. e., the number of hydroxyl groups should be approximately equal to the number of carboxyl groups. If alcohols other than the dihydric alcohols are used, the amount of the latter will be reduced in proportion to the number of hydroxyl radicals in substituent alcohols. If polyhydric alcohols are used to partially replace the dihydric alcohols, they may be employed in quantities ranging from about 0.1 to about 5.0 mol per cent. The amount of monohydric alcohol substituent may vary from about 2 to about 7 mol per cent.

An even wider latitude in proportions may be used in the case of the acids. Amount of unsaturated dibasic acid may be varied from about 1 to about 50 mol per cent. The saturated dibasic acid component may vary from 0 to about 49 mol per cent. The amount of monobasic acid will vary from about 2 to about 7 mol per cent. In some cases it may be desirable to use a polybasic acid containing more than two acid groups such a aconitic, tricarballylic or citric acid in a range varying from about 0.1 to about 5.0 mol per cent.

The acidic and alcoholic components are reacted together at elevated temperatures ranging from about 150 to about 250° C., using an inert gas such as nitrogen or carbon dioxide to exclude air and aid in the removal of water. The condensation products are liquid resins, the properties of which are determined by the amounts and nature of the various components.

For the purposes of this invention the condensation of the several components of the alkyd resin is stopped before an acid number of less than 100 is obtained.

The melamine resins which may be used to modify the unsaturated alkyd resins are the methylol melamines and the lower alkyl ethers thereof in which the alkyl groups contain from 1 to 8 carbon atoms. These particular melamine derivatives are liquid resins which are both soluble and fusible. They are compatible with unsaturated alkyd resins having acid numbers of 100 or greater in all proportions. To obtain the particular products of this invention the amount of melamine derivative should be limited to from 10 to 25 parts per 100 parts of unsaturated alkyd resins.

The foamed products of this invention are particularly advantageous in that they may be obtained in stable form in a soluble, fusible state, a completely insoluble, infusible state, or anywhere between the two extremes by simply controlling the duration of the heating cycle at 150 to 180° C. They may be used as refrigeration insulation, in life rafts, buoys and other objects requiring buoyancy, etc.

It is obvious that many variations may be made in the products and processes of this invention without departing from the spirit and scope thereof as defined by the appended claims.

What is claimed is:

1. A synthetic resin foam prepared by heating at 140 to 150° C. a mixture comprising 100 parts of a fusible unsaturated alkyd resin having an acid number of at least 100, said alkyd resin having been derived from a dihydric alcohol and an unsaturated dibasic carboxylic acid, 10 to 25 parts of a melamine derivative taken from the group consisting of methylol melamines and the lower alkyl ethers thereof in which the alkyl group contains from 1 to 8 carbon atoms, and 1 to 25 parts of diphenyl-4,4'-di(sulfonyl azide).

2. A synthetic resin foam as in claim 1 wherein the foam has been rendered infusible by heating at 150 to 180° C. for at least 2 hours.

3. A synthetic resin foam as in claim 1 wherein the melamine derivative is hexamethylol melamine.

4. A synthetic resin foam as in claim 1 wherein the melamine derivative is a butyl ether of hexamethylol melamine.

5. A process for preparing synthetic resin foams which comprises mixing 100 parts of an unsaturated fusible alkyd resin having an acid number of at least 100, said alkyd resin having been derived from a dihydric alcohol and an unsaturated dibasic carboxylic acid, with from 10 to 25 parts of a melamine derivative taken from the group consisting of methylol melamines and the lower alkyl ethers thereof in which the alkyl group contains from 1 to 8 carbon atoms, and from 1 to 25 parts of diphenyl-4,4'-di(sulfonyl azide), and heating the mixture at 140 to 150° C.

6. A process as in claim 5 wherein the melamine derivative is hexamethylol melamine.

7. A process as in claim 5 wherein the melamine derivative is a butyl ether of hexamethylol melamine.

JOHN B. OTT.

No references cited.